May 27, 1930. S. B. GORBUTT 1,760,828
LOGGING ENGINE
Filed April 6, 1927 5 Sheets-Sheet 1
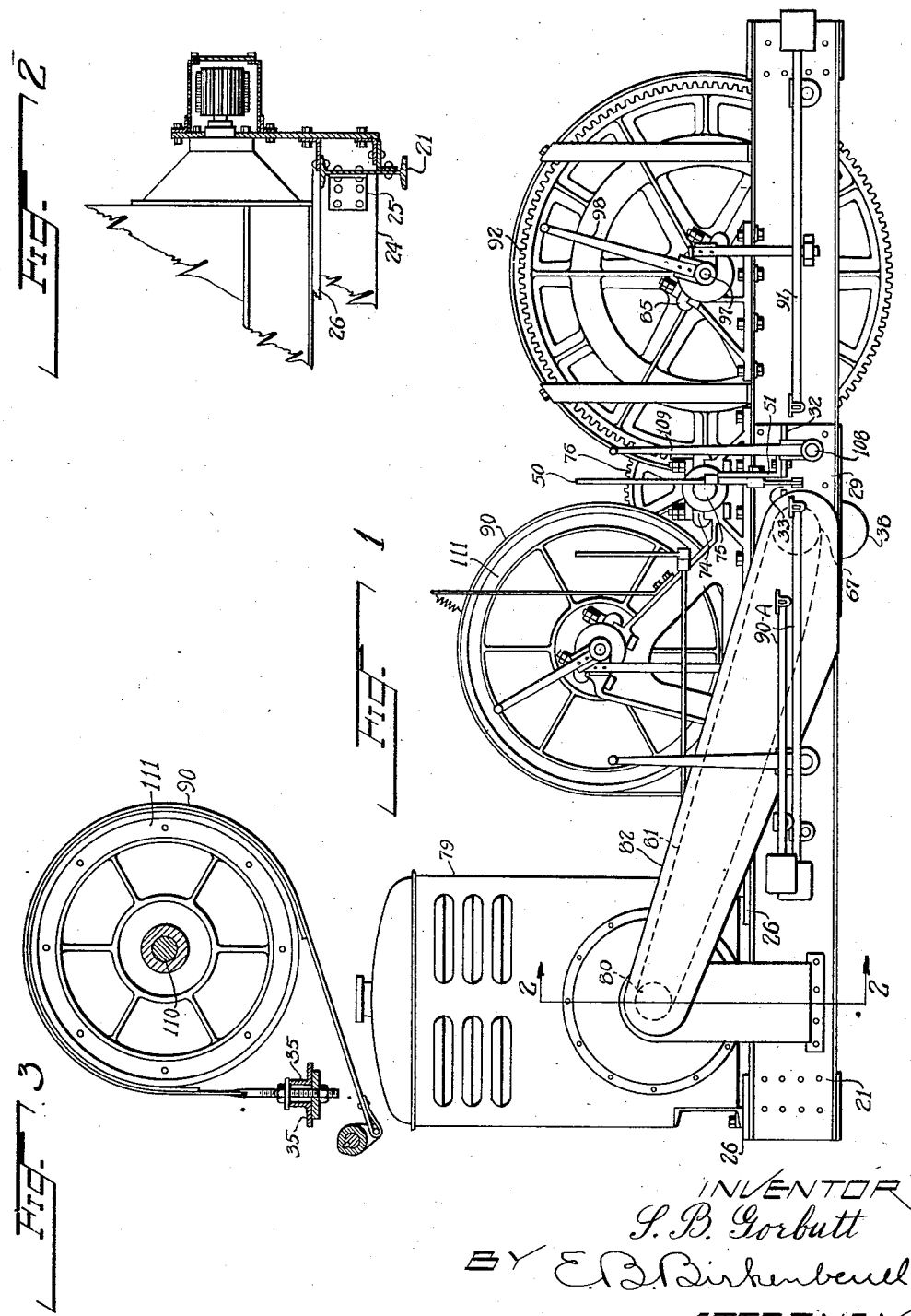
INVENTOR
S. B. Gorbutt
BY E. B. Birkenbeuel
ATTORNEY

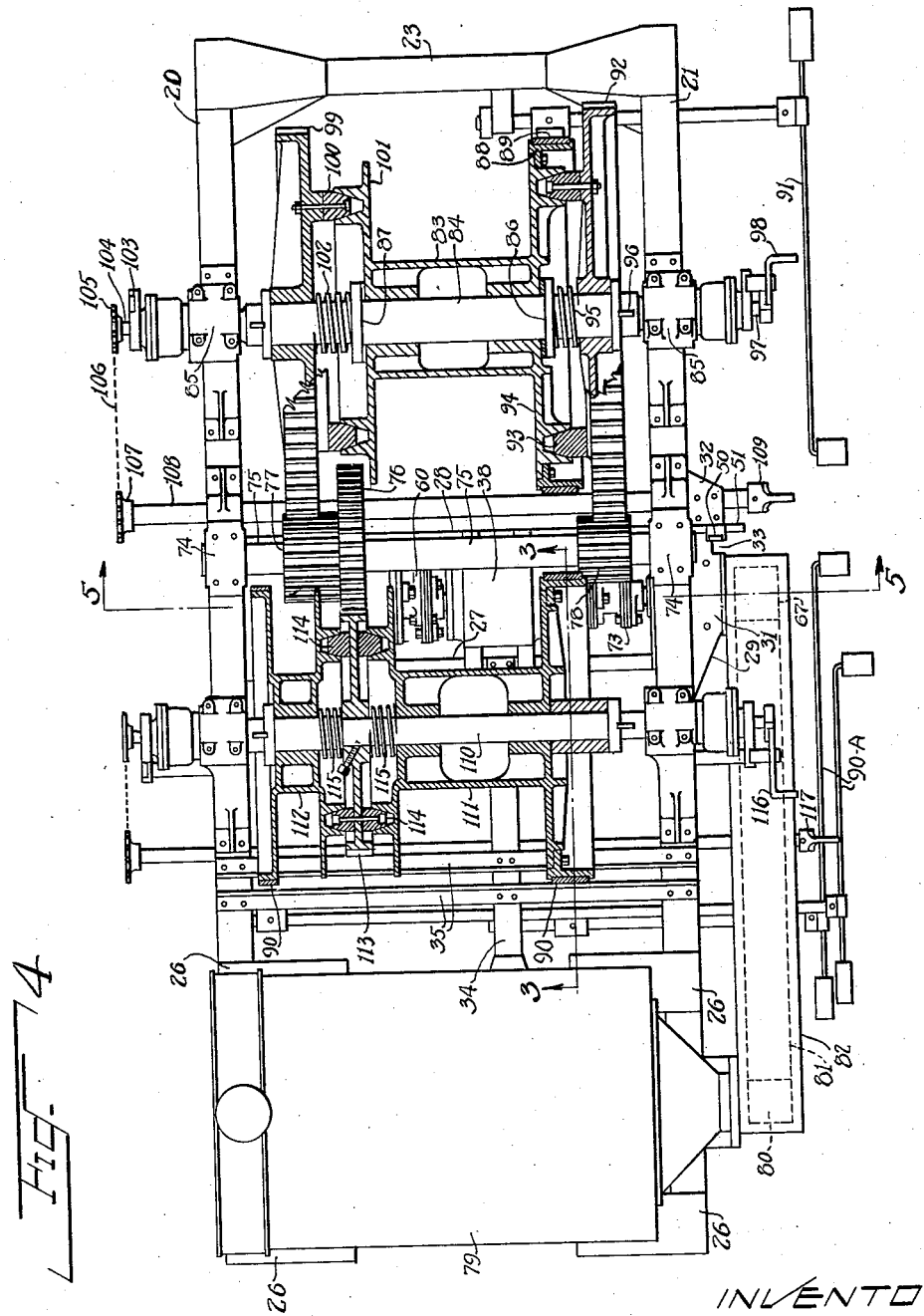

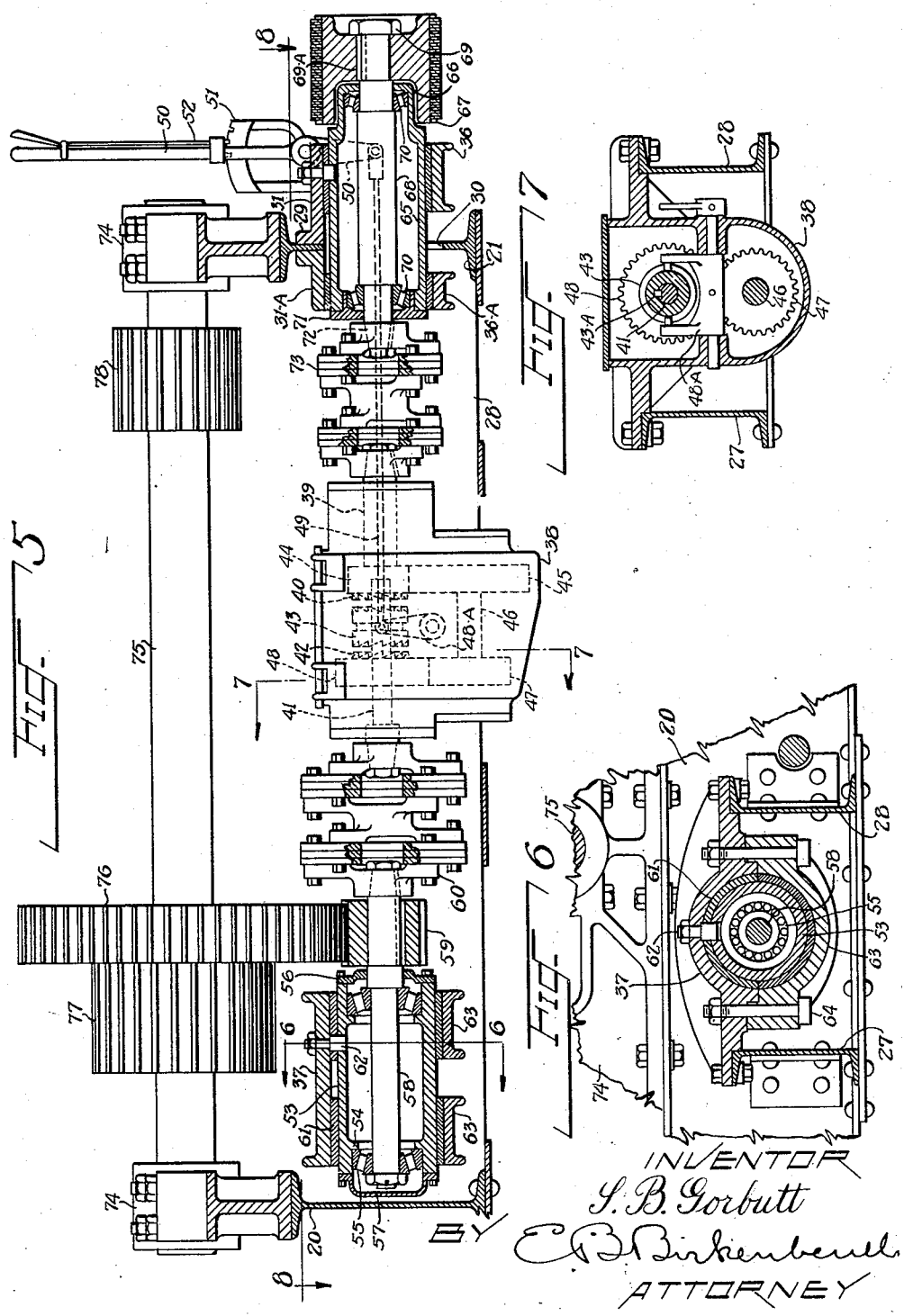

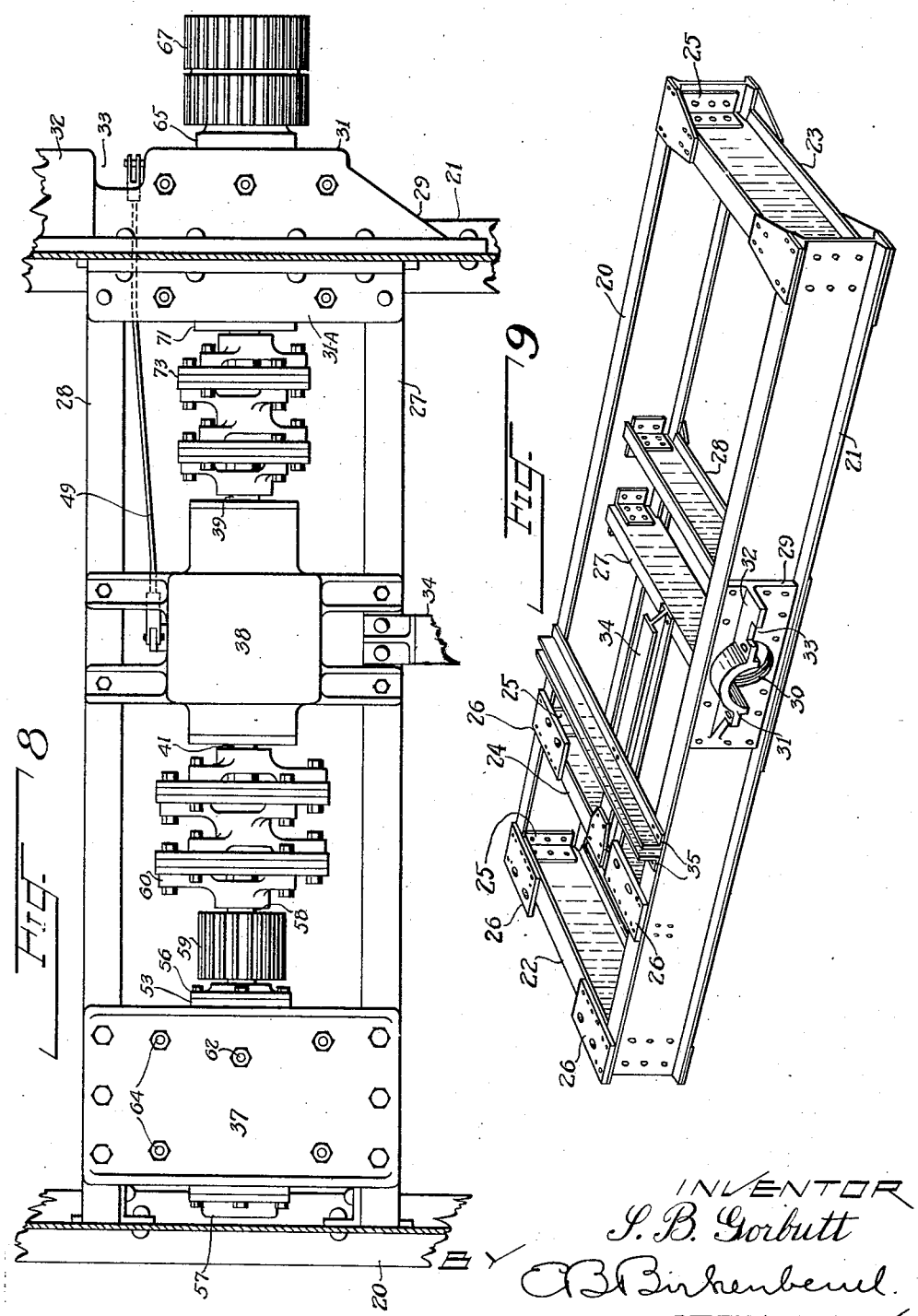

May 27, 1930. S. B. GORBUTT 1,760,828
LOGGING ENGINE
Filed April 6, 1927 5 Sheets-Sheet 5
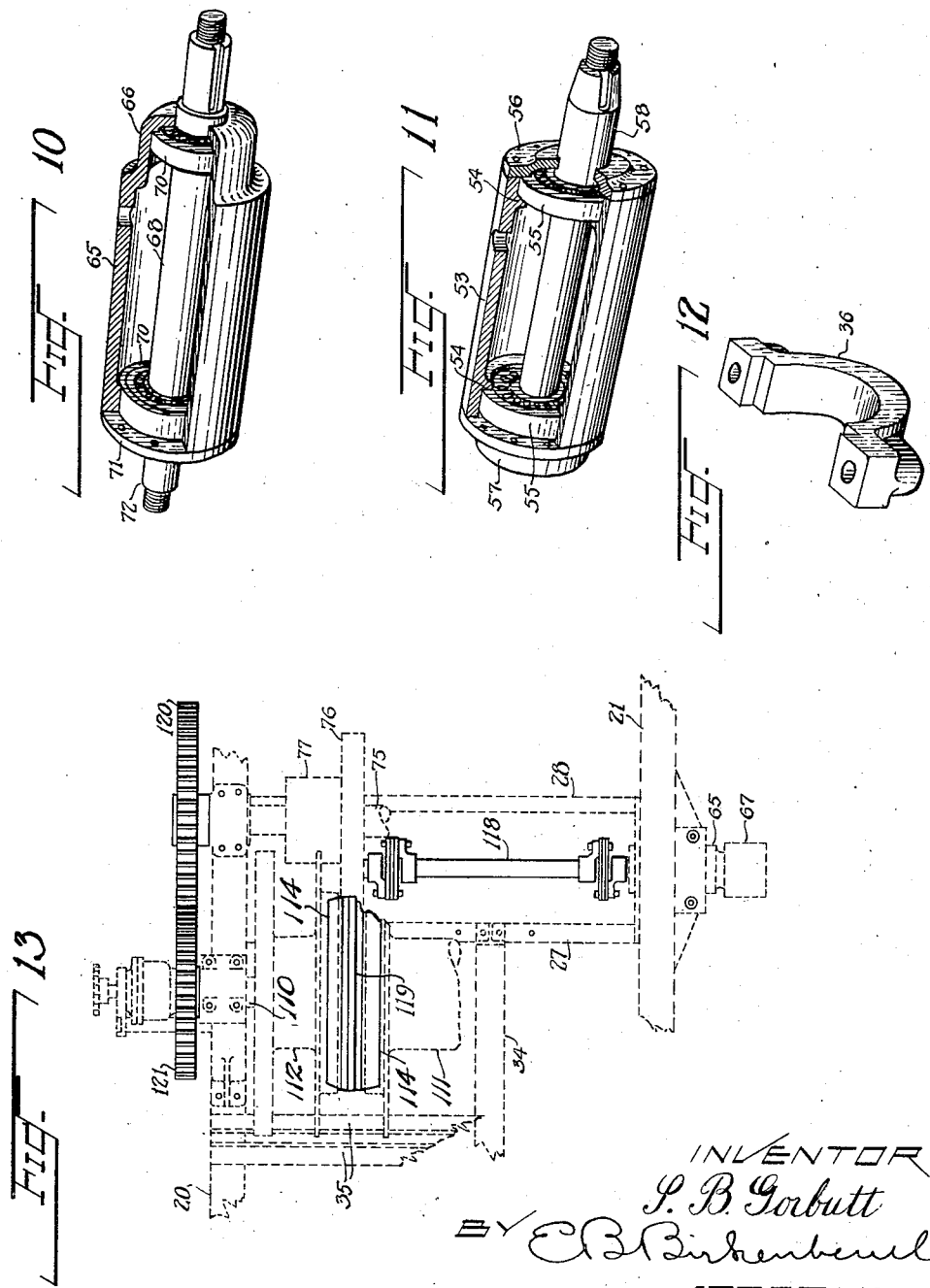

Patented May 27, 1930

1,760,828

UNITED STATES PATENT OFFICE

SIDNEY B. GORBUTT, OF PORTLAND, OREGON, ASSIGNOR TO WILLAMETTE IRON AND STEEL WORKS, OF PORTLAND, OREGON

LOGGING ENGINE

Application filed April 6, 1927. Serial No. 181,382.

This invention relates generally to a machine for handling wire rope, and especially to an engine such as is used in the logging industry for the purpose of transporting logs by means of cableways.

The first object of this invention is to construct a logging engine of the yarder type having an extremely low center of gravity and a correspondingly reduced weight.

The second object is to employ a chain driven countershaft whose axis is below the top of the main frame.

The third object is to provide a two-speed transmission shaft which can easily be replaced by a spacer shaft so as to obtain a single speed and vary the ratio between certain shafts by the use of gears placed outside of the main frame, thereby making the entire machine more flexible in regard to changes in speed ratios obtainable between the various shafts.

The fourth object is to eliminate the need for self-aligning bearings for the roller bearings of the countershafts by the employment of flexible couplings between the roller bearings themselves, thereby rendering the entire machine more independent of frame distortion than is ordinarily the case.

The fifth object is to provide a special mounting for the roller bearings whereby they can be assembled into units and installed in an engine frame in a relatively short space of time, or can be removed therefrom without disturbing the remainder of the machine.

The sixth object is to pass one of the shafts through the I beam frame and to utilize the mounting for support for the bearing as a stiffener for this portion of the frame.

The seventh object is to support the transmission and left side bearing on cross members, thereby greatly reducing the bad effects ordinarily arising from frame distortion and to still further reduce such bad effects by the introduction of flexible couplings on each side of the transmission.

The eighth object is to provide a second intermediate shaft with a gear which meshes with the trip drum shaft gear when it is desired to eliminate the transmission in order to secure ratios not obtainable through the transmission itself.

The ninth object is to provide a special form of frame construction including a transverse support for the brake anchors to permit the brakes to be anchored in any position.

The tenth object is to swing the gear shift levers on the right side of the frame in transverse relation thereto and to hold same by means of a notched quadrant.

The eleventh object is to position the engine clutch control levers conveniently near the gear shift lever.

The twelfth object is to so arrange the various parts that the right direction of rotation is secured for the drums, and at the same time providing the greatest degree of flexibility in the way of changes of speed ratios between the drums themselves and with relation to the engine.

These, and other objects, will become more apparent from the specification following as illustrated in the accompanying drawings, in which:

Figure 1 is a side elevation of the logging engine taken from the operator's side. Figure 2 is a fragmentary section taken along the line 2—2 in Figure 1. Figure 3 is a fragmentary section taken along the line 3—3 in Figure 4. Figure 4 is a plan of the entire machine with the drums and portions of the gear broken away in section. Figure 5 is a section taken along the line 5—5 in Figure 4. Figure 6 is a section taken along the line 6—6 in Figure 5. Figure 7 is a section taken along the line 7—7 in Figure 5. Figure 8 is a section taken along the line 8—8 in Figure 5. Figure 9 is a perspective view of the frame showing the stiffening member on the side frame where the countershaft passes through same and the cross member supports for the transmission case and brake anchors. Figure 10 is a perspective view of one of the bearings and shaft units with a portion of the housing cut away in section showing the unit at the chain end of the shaft. Figure 11 is a perspective view of the bearing and shaft unit at the pinion end of the first intermediate shaft with a portion of the housing broken away in section. Figure 12 is a perspective view of the cap which supports the housing. Figure 13 shows the alternative form in which the transmission is replaced by a spacer shaft and the trip drum shaft is driven by a pair of outboard gears.

Similar numbers of reference refer to similar parts throughout the several views.

Referring in detail to the drawings, for the purpose of simplifying the explanation the machine will be divided into units as follows:

Frame

The frame of this logging engine includes a pair of side members 20 and 21, preferably in the form of I beams, which are held in spaced relation by the end cross ties 22 and 23 and the intermediate tie 24, all of which are united to their associated members by the riveted clips 25. Plates 26 are secured on the ends of the ties 22 and 24 to receive the engine which furnishes the motive power.

A smaller and lower pair of cross ties 27 and 28 between the frames 20 and 21 is used to support the transmission. Outside of the member 21 is riveted a base 29 of a bearing support which is provided with the opening 30 which extends through the frame 21. The base 29 reinforces the frame 21 at the point where it is weakened by the formation of the opening 30. Projecting outwardly from the base 29 is a support 31 for a bearing housing, said support having a horizontal web 32 extending therefrom. The web 32 is provided with a notch 33 which provides clearance for one of the operating levers.

Between the members 24 and 27 and resting on the latter is a longitudinal tie 34 whose upper edge is flush with the top of the frames 20 and 21. Across the members 20, 34 and 21 are secured the spaced angles 35 which serve as supports for the brake anchors. Bolted to the under side of the support 31 is a cap 36.

Transmission

Across the members 27 and 28 and close to the frame 20 is bolted a bearing support 37. Across the mid portion of the ties 27 and 28 is secured a transmission 38 such as are on common sale in the market. Briefly, this transmission furnishes either a direct drive through its shaft or a one speed reduction in which a drive shaft 39 has secured thereto a clutch jaw 40. The driven shaft 41 has one end journaling in the clutch jaw 40 and has rotatably mounted thereon a clutch jaw 42 between which and the clutch jaw 40 is slidably mounted the jaw 43 which is provided with a key 43—A.

Secured to the shaft 39 adjacent to the jaw 40 is a gear 44 which meshes with the gear 45 on the countershaft 46 whose smaller gear 47 meshes with the larger gear 48 which is loose on the shaft 41 but attached to the jaw 42. The sliding jaw 43 is grooved to receive the forked lever 48—A which is operated by the rod 49 connected to the lever 50 which can be held in either gear position or in a neutral position by the notched quadrant 51 and pawl 52 on the lever 50. The quadrant 51 is mounted on the web 32. With the lever 50 in one position the drive is directly through the shafts 39 and 41, and in the opposite position the drive is through the gears 44 to 48 giving a proportionate reduction in speed. With the lever in the mid position the shaft 39 does not drive the shaft 41.

Bearing units

Within the support 37 is mounted the inner bearing unit which consists of a cylindrical housing 53 having the internal shoulders 54 against which are placed the roller bearings 55 which are held in place by the retainers 56 and 57, the former of which has an opening for the shaft 58 to which is secured the pinion 59 and one end of the universal coupling 60; the other end of which is keyed to the shaft 41. Babbitt 61 is used to hold the housing in position within the support and the dowel 62 prevents rotation of the housing 53. The support 37 is provided with the cap 63 which is secured by the bolts 64.

The outer bearing unit is similar to the inner unit, except that it is held in the supports 31 and 31—A by the caps 36 and 36—A. Its housing 65 has one end 66 reduced to allow it to extend well into the sprocket 67 which is held on to the shaft 68 by a nut 69 and prevented from rotating on the shaft by means of a key 69—A. The shaft 68 journals in the roller bearings 70, one of which is within the sprocket 67 and the other is at the open end of the housing 65. In this instance only one retainer 71 is required, but the shaft projects from both ends of the unit. The end 72 of the shaft 68 is keyed to one end of the universal coupling 73 whose opposite end is keyed to the shaft 39.

Second intermediate shaft

Journaling in the bearings 74 above the first intermediate shaft just described, which includes the roller bearing units, is a second intermediate shaft 75 on which is keyed the intermediate gear 76 which meshes with the pinion 59. Alongside of the gear 76 is the high speed pinion 77. At the other end of the shaft 75 is the low speed pinion 78.

Motive power and drums

On the cross ties 22 and 24 is mounted an internal combustion engine 79 and its sprocket 80 through the chain 81 drives the sprocket 67 on the first intermediate shaft above described of which the shaft 68 is a portion. The guard 82 is placed around the sprockets 67 and 80 and the chain 81.

Between the shaft 75 and the tie 23 and above the frames 20 and 21 is mounted the main drum 83 whose shaft 84 is mounted in the bearings 85. The drum 83 is rotatably mounted between the collars 86 and 87. One flange of the drum 83 carries the friction flange 88 for the friction brake band 89. The band 89 is actuated through the foot lever 91 by means (not shown).

The low gear 92 which meshes with the pinion 78 is rotatably and slidably mounted on the shaft 84 and is provided with friction blocks 93 which can engage a suitable groove in the side of the flange 94. The gear 92 is urged away from the drum 83 by the spring 95 and is moved toward same by means of the key 96 which, in turn, is moved by the threaded pin 97 to which rotation is supplied by the crank 98.

The high gear 99, which meshes with the pinion 77, is provided with friction blocks 100 which can engage a suitable groove in the flange 101 of the drum 83. The gear 99 is urged away from the drum 83 by the spring 102. In this instance the handle of the crank 103 is removed and the threaded shaft 104 is rotated by the sprocket 105 from the chain 106 which is driven by the sprocket 107 on the transverse shaft 108 whose operating end is provided with a crank 109 located conveniently near the other operating levers.

On the opposite side of the shaft 75 is mounted a trip drum shaft 110 on which is slidably mounted a trip drum 111 and the slidable straw drum 112. Between these drums is secured a drive gear 113 whose friction blocks 114 are urged out of engagement with their respective drums by the springs 115. The gear 113 meshes with the gear 76. The drum 111 is moved into a driven position by the crank 116, and the drum 112 is moved into a driven position by the crank 117. These cranks function in exactly the same manner as do the cranks 98 and 109, and the description of the details of the connecting parts is therefore omitted. The brake bands 90 of the drums 111 and 112 are anchored on the angle 35 and are actuated by the levers 90—A.

It will be observed that by this arrangement the engine speed is applied directly to the first intermediate shaft, the delivery end of which itself has two speeds, either of which can be applied to the second intermediate shaft 75 which, inturn, has a two speed connection with the main drum. In other words—for any given engine speed it is possible to secure four different speeds for the drum 83 and, owing to the fact that the drive gear 113 is directly connected to the two speed shaft 75, it can be seen that for any given engine speed either of the drums 111 or 112 may be driven at two different speeds. Should this range of speeds be insufficient to suit a given case then the two speed unit, that is the transmission 38, is removed and a spacer shaft 118 is substituted therefor and the gear 113 is replaced by a plain disk 119 which carries the friction blocks 114.

A pair of outboard gears 120 and 121 is now used to connect the shafts 75 and 110 and it is evident that it is a very simple matter to install any suitable pair of gears to secure the desired speed of rotation without dismantling any other portion of the machine.

It can also be seen that by a slight change in the parts the machine may be converted from a type having a relatively large number of speeds whose extremes are limited, to a machine having fewer speeds which can be varied from a greater range than is possible in the first described form.

While in some cases of work this would be of little value it is highly important in the logging industry, since there is such a wide range of conditions and tasks which such machines must perform, and it is not sure that they will remain at a given task for any great length of time. In fact, nearly every engine sold is special in one way or another, and it is of great advantage to the manufacturer of such equipment if, by an assembling change, he is able to supply any one of a large variety of requirements.

The low slung transmission shaft is also of extreme importance since it permits the lowering of the center of gravity of the machine which results in a considerable reduction in weight of the entire machine, which is of great importance when it is remembered that these machines are often required to drag themselves around in the woods and up grades which it is difficult for even a man to negotiate.

I am aware that a great many types of logging engines have been constructed in the past and it is not my intention to cover such devices broadly but only to refer to such devices as fall fairly within the following claims.

I claim:

1. In a logging engine, the combination of a frame; a motor mounted on the rearward end of said frame; a two speed main drum at the forward end of said frame; a one speed drum between said engine and main drum; a first intermediate shaft driven by said motor; a change gear mechanism and a two speed second intermediate shaft driven by said first intermediate shaft and driving all of said drums in the same direction and adapted to double the number of speeds obtainable from each of said drums.

2. In a logging engine, the combination of a frame; a motor on the rearward end of said frame; a main drum at the forward end of said frame having two speed gears on the shaft thereof adapted to drive said drum at each of two speeds for one given countershaft speed; a first intermediate countershaft below the top of said frame and driven by said motor; a second intermediate countershaft having gears thereon meshing with said drum gears; and means between said first and second countershafts whereby said second shaft may be driven at one or the other of two speeds for a given speed of said engine in order that said main drum can be driven at one of four speeds from a given engine speed.

3. In a logging engine, the combination of a frame; a motor mounted on the rearward end of said frame; a divided first intermediate shaft near the middle of said frame and passing through one side thereof below its upper face; a sprocket on the outer end of said shaft; a pinion on the inner end of said shaft; a transmission between said sprocket and opinion whereby said pinion may be rotated at one of two speeds or held out of gear with relation to the sprocket; a chain driven from said motor for driving said sprocket; a second intermediate countershaft above said frame driven from the pinion on said first countershaft; and a pair of gears on said countershaft having driving and clutch connections whereby associated drums may be driven at any of four speeds with relation to the speed of said motor.

4. In a logging engine, the combination of a frame; a countershaft passing through one side of said frame below its upper edge; a motor on said frame having a sprocket drive for driving said countershaft, said countershaft consisting of two portions, the inboard portion of which is coaxial with its outboard portion and having a pinion near one end thereof; a two speed transmission between the adjacent ends of the shaft sections; a flexible coupling between each end of said transmission and the nearest shaft end; and a drum driven from the pinion on said countershaft.

5. In a logging engine, the combination of a pair of spaced horizontal frame members with a pair of spaced transverse ties between said frames; a two-part countershaft passing through one side of said frame member having one end thereof supported by the frame through which it passes and the other end thereof supported by the cross ties, in combination with a transmission near the middle of said shaft having flexible couplings at each end thereof forming connections with said shaft portions; and a pinion on the inner end of one part of said counter shaft.

6. In a logging engine, the combination of a frame having a pair of spaced side members and a pair of end cross ties for holding said side members in spaced relation and having a pair of spaced cross ties near the middle of its length whose upper edges are below the upper edges of said side frame members, one of said side frames having an opening formed therein between said last mentioned cross ties; a bearing plate surrounding said opening and forming a reinforcement for said frames, said plate having an outwardly projecting bearing support formed thereon having a removable lower half, said support having an outboard bearing babbitted therein, the opposite end of said spaced cross ties having a bearing support mounted thereon having inboard bearings.

7. A logging engine having a longitudinally horizontal frame, and having an engine and operating drums mounted above the top of said frame in combination with a flexible countershaft passing through one side of said frame below the top thereof for the purpose of lowering the center of gravity of the unit; and gears adapted to transmit power from said engine to said countershaft through said frame and to distribute same to said drums.

8. A logging engine having a frame on which is mounted an engine and a plurality of operating drums, a two-part countershaft interposed between said engine and drums for the purpose of delivering power and altering the speed ratio between said drum and engine, said countershaft comprising two coaxial shaft sections one of which passes through one side of said frame and the other is on the inside of the opposite frame member, said shaft sections having a transmission interposed between same adapted to transmit the speed of one shaft to the other shaft or to vary the relative speeds or to disengage said shaft sections entirely, said transmission having provided at each end thereof a flexible coupling by means of which it is attached to its respective shaft portion.

9. A logging engine having a pair of spaced side frames; a countershaft mounted across said side frames; an engine mounted on said side frames having a chain drive to said countershaft; drums mounted on opposite sides of said countershaft having gears rotatably connecting said countershaft and drums in a manner to drive said drums in the same direction, one of said drums having the gears for connecting same to said countershaft mounted on the outside of its frame in a manner to permit the replacement and exchange of said gears without the removal of any other parts of the engine.

10. A flexible countershaft having in combination a pair of spaced frame members, an inboard bearing on one of said frames, an outboard bearing on the other frame, a shaft in said outboard bearing, a drive sprocket on the outer end of said shaft, a shaft in said inboard bearing, a pinion on said last mentioned shaft, the inner ends of both shafts having flexible couplings thereon, and means for connecting the flexible couplings of both shaft portions.

SIDNEY B. GORBUTT.